United States Patent [19]

Benuzzi

[11] 4,065,991
[45] Jan. 3, 1978

[54] APPARATUS FOR FEEDING STRIPS OF PANELS

[75] Inventor: Gino Benuzzi, Bologna, Italy

[73] Assignee: Giben Impianti S.p.A., Pianoro (Bologna), Italy

[21] Appl. No.: 751,574

[22] Filed: Dec. 17, 1976

[30] Foreign Application Priority Data

Dec. 23, 1975 Italy .................................. 12947/75

[51] Int. Cl.² ............................ B27B 5/06; B26D 7/06
[52] U.S. Cl. ......................................... 83/272; 83/276;
83/278; 83/408; 83/437
[58] Field of Search ................. 83/437, 408, 207, 241,
83/268, 272, 276, 278

[56] References Cited

U.S. PATENT DOCUMENTS

| | | | |
|---|---|---|---|
| 3,662,798 | 5/1972 | Campbell | 83/272 |
| 3,768,352 | 10/1973 | Campbell | 83/104 |
| 3,826,164 | 7/1974 | Campbell | 83/272 |

Primary Examiner—Donald R. Schran

Attorney, Agent, or Firm—Pollock, Vande Sande & Priddy

[57] ABSTRACT

The strips to be fed to a cutting line are positioned side by side on a supporting table. Above the table there is arranged a structure which is movable transversally with respect to the feeding direction of the strips. On the underside of the structure there are provided two pusher carriers, in the form of elongated bars carrying a plurality of pushers intended to engage the strips on the table. Each pusher carrier is movable, independently with respect to the other one, towards and away from the cutting line. The pusher carriers can be moved transversally with respect to the feeding direction, so that each one of the pusher carriers can selectively engage a predetermined number of strips. Thereafter, the pusher carriers are moved towards the cutting line independently the one from the other, with consequent variations of the amount of feed of the strips, which will eventually result into obtaining panels of different sizes from the different strips.

4 Claims, 9 Drawing Figures

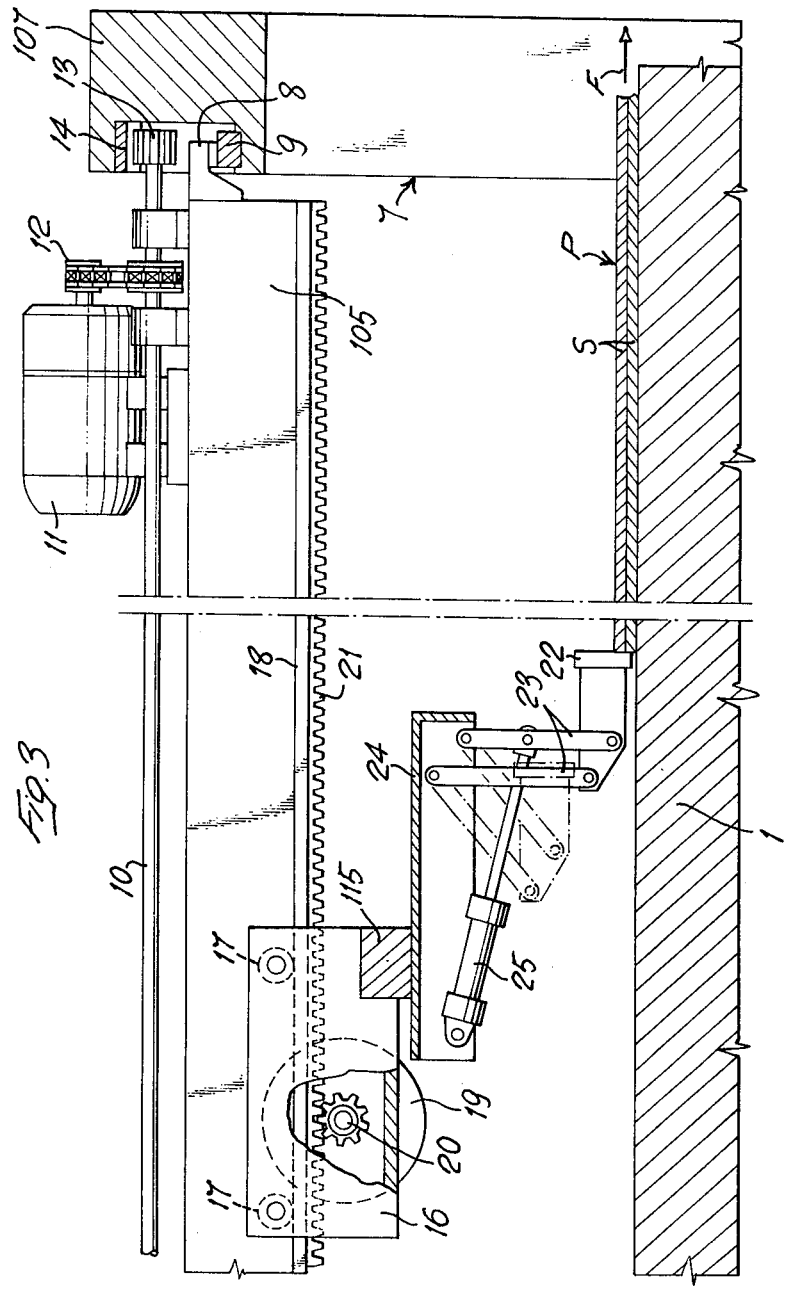

APPARATUS FOR FEEDING STRIPS OF PANELS

SUMMARY OF THE INVENTION

Object of the present invention is an apparatus for feeding strips of panels to a panel sizing and cutting machine, i.e. a machine for forming large panels into smaller, accurately dimensioned panels for use in furniture building, home building, TV cabinets, etc. More particularly the present invention relates to an apparatus which receives a plurality of elongated strips (single strips or strip stacks) positioned side by side and selectively feeds them along a defined feeding direction to a saw line at a crosscut station, with the possibility of selective variation of the amount of feed of at least one strip (or strip stack) relative to the others, so that panels of different sizes may be cut from the various strips.

According to the invention the strips, which are positioned on a support table arranged immediately before the saw or cutting line, are fed to the cutting line by means of at least two pushers, substantially in the form of elongated bars arranged transversally with respect to the feeding direction. The two pushers can be moved each one independently from the other towards and away from the cutting line, and can be also moved transversally with respect to the said feeding direction, so that each one of the said pushers can selectively engage a predetermined number of strips.

Other objects and advantages of the apparatus according to the invention will appear evident from the following specification made with reference to the attached drawings.

BRIEF DESCRIPTION OF THE DRAWINGS

FIG. 3 shows an enlarged detail sectioned along line III—III of FIG. 1;

DESCRIPTION OF THE PREFERRED EMBODIMENT

Figure 1:
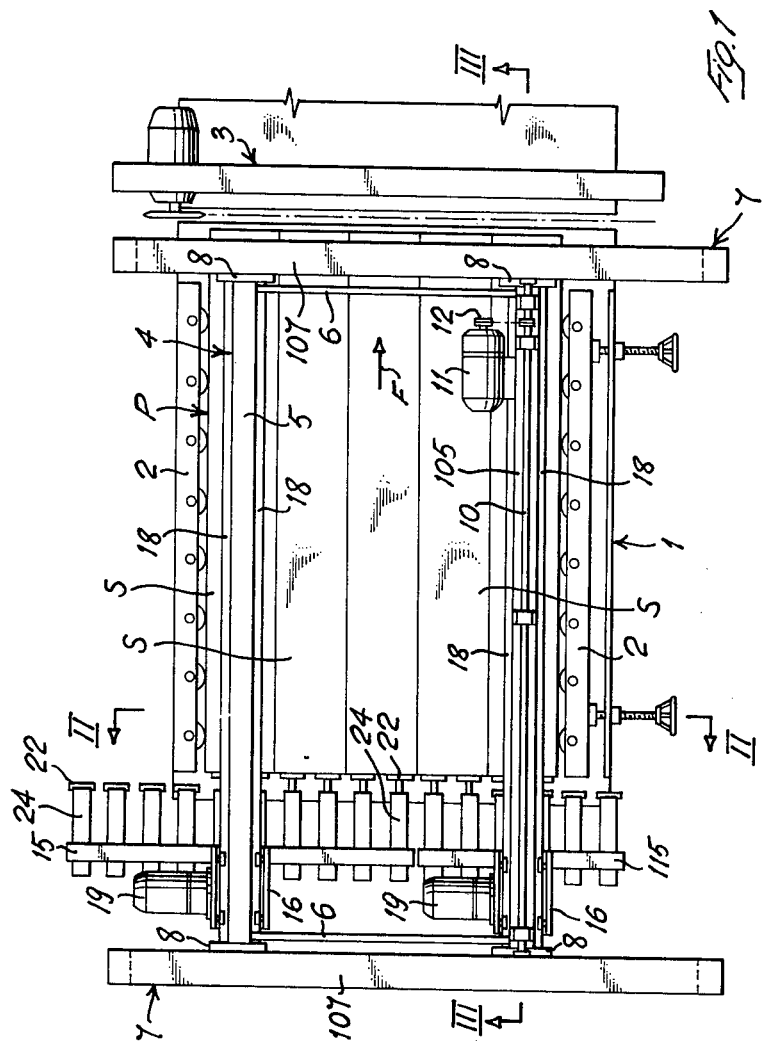
FIG. 1 is a view from the top of the feeding apparatus according to the invention.
Figure 2:
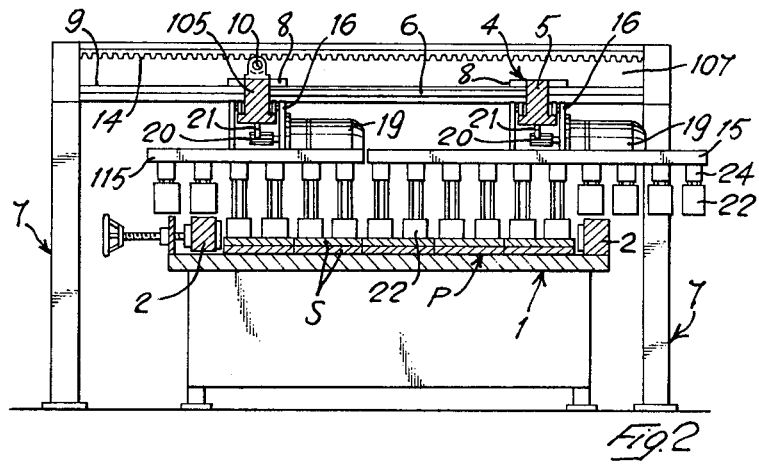
FIG. 2 is a section along line II—II of FIG. 1.

The feeding apparatus according to the invention forms part of a panel cutting and sizing machine for accurately forming large panels into smaller, precisely dimensioned panels. The said feeding apparatus comprises a supporting table 1 provided with guide bars 2 each presenting on the side which comes into contact with the sides of the panels, suitable rollers. In correspondence of the outlet end of table 1 (located at the right in FIG. 1) there is arranged a transverse cutting saw 3 which performs a cut along a line (indicated by dash-and-dot lines in FIG. 1) which is perpendicular with respect to the feeding direction F of the panels. On the support table 1 there are arranged the panel strips S of a stack of panels P which has been cut according to longitudinal parallel cutting lines, so as to result subdivided into a plurality of stacks of panel strips S arranged with their longitudinal axis parallel to the said feeding direction F. The said panel strips S must be fed in the feeding direction F either jointly, or separated into two groups, so as to be subdivided, upon transverse cutting of saw 3, in the first case into smaller panels of equal dimensions, and in the second case into two groups of smaller panels presenting different longitudinal dimensions.

The feeding apparatus comprises a support structure 4 carrying the pushers which will effect the selective pushing of the panel strips S, said support structure 4 being arranged above the table 1 and presenting two longitudinal rails 5, 105, parallel to the feeding direction F and connected at both ends by transverse rods 6. The support structure 4 is movable in a direction which is transversal to the feeding direction F, on the upper transverse bars 107 of two gantry structures 7. To this purpose, the ends of the said rails 5, 105 present outwardly projecting sliding shoes 8 (see particularly FIG. 3) which are capable of sliding on a slide guide 9 provided longitudinally on the transverse bars 107 of gantry structures 7. For the transverse positioning of the support structure 4 along the slide guides 9, there is provided a drive shaft 10, which longitudinally extends from one end to the other of the rail 105, said drive shaft 10 being driven through motor 11 and transmission 12, and presenting at its ends the pinions 13 which engage the racks 14 provided on the upper transverse bars 107 of the gantry structures 7.

Transversally with respect to each rail 5, 105, there is arranged a respective pusher carrier element 15, respectively 115, which carries the pushers for the strips. The first pusher carrier 15, located in correspondence of rail 5 presents a length which is substantially equal to the width of the stack P of panels (subdivided into strips S), while the second pusher carrier 115 presents a length which is smaller than the width of the said stack P of panels, and usually corresponds to a fraction of said width (see particularly FIGS. 4, 5 and 6).

The pusher carriers 15, 115 are secured each to the lower portion of a respective carriage 16 which is movable through rollers 17, on guides 18 provided on the rails 5, 105. Each carriage 16 is provided with a driving motor 19 which drives a pinion 20 engaging a rack 21 provided longitudinally on the rails 5, 105. In this manner, each carriage 16 (and the pusher carrier 15, 115 carried by same) can be moved independently from the other carriage in a direction which is parallel to the feeding direction F.

Each pusher carrier 15, 115 carries a plurality of single pushers 22 arranged along its length, each pusher 22 being carried by a support bar 24, through an articulated parallelogram 23, in such a manner that, upon actuation of a hydraulic piston-and-cylinder unit 25, each single pusher 22 can be lowered into working position (so as to come into contact with the rear side of the strips S) or lifted into unoperative position (see dash-and-dot-line representation in FIG. 3).

Figure 4:
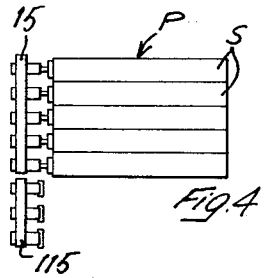
FIGS. 4, 5 and 6 show diagrammatically as many different working positions of the feeding apparatus.

Referring now particularly to FIGS. 4 (and 4a) to 6 (and 6a), there is shown by way of example, a possible way of working of the apparatus according to the invention.

Figure 4A:
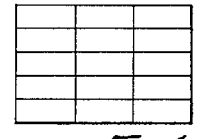
FIGS. 4a, 5a and 6a show diagrammatically as many different possibilities of cutting and sizing a panel, obtainable with the corresponding working positions illustrated respectively in FIGS. 4, 5 and 6.

According to FIG. 4, the pusher carrier 15 engages the rear portion of all the five strips S represented, and therefore the forward movement (in the direction of movement F—see FIG. 1) of said pusher carrier 15 eventually leads to the sizing of the panels as shown in FIG. 4a, while pusher carrier 115 is unoperative.

Figure 5:
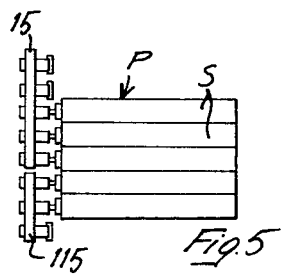

According to FIG. 5, the pusher carriers 15, 115 have been transversally shifted so that pusher carrier 15 engages three strips S, while pusher carrier 115 engages two strips. The two sets of strips can be moved to the transverse cutting according to different lengths, and a possible sizing which thus results is illustrated in FIG. 5a.

Figure 5A:
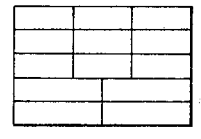
Figure 6:
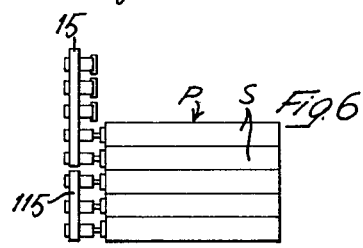
Figure 6A:
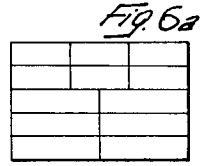

In FIGS. 6 and 6a there is illustrated a situation which is exactly the inverse of the situation illustrated in FIGS. 5 and 5a, with the only difference that pusher carrier 115 (which presents a lesser length than pusher carrier 15) does not present any unoperative pusher.

It is to be noted that, while in the described embodiment the pusher carriers are two in number, they may be actually more than two, thus offering a wider choice of possible combinations in the sizing of the panels. Also (see particularly FIG. 3) the device has been illustrated as processing a stack formed of two superposed panels, but it is to be understood that this illustration is not limitative, since the illustrated feeding apparatus can handle a single panel P or a stack of any suitable number of panels, as it is well known in the art. The only required condition is that the panels be subdivided into strips, according to cut lines which are parallel to the feeding direction F. This subdivision into strips S can be effected by any suitable cutting machine as it is well known in the art.

It is believed that the invention will have been clearly understood from the foregoing detailed description of a preferred embodiment. Changes in the details of construction may be resorted to without departing from the spirit of the invention, and it is accordingly intended that no limitation be implied and that the hereto annexed claims be given the broadest interpretation to which the employed language fairly admits.

I claim:

1. An apparatus for feeding strips of panels to a panel cutting and sizing machine, in which the strips of panels are arranged the one adjacent to the other side by side, and the adjacent sides are parallel to the feeding direction, the said strips being fed to a cutting device which cuts the strips along a cutting line which is arranged transversally with respect to the said feeding direction, said apparatus comprising:
   a. a support table onto which the strips are positioned side by side;
   b. at least two pusher members arranged so as to push the strips towards the cutting line, each one of said pusher members being movable independently from the other in a direction towards and away from the said cutting line;
   c. means for moving the said pusher members in a direction which is transversal with respect to the feeding direction and parallel to the cutting line, in such a manner to cause the selective engagement of the strips to be pushed by each one of the said pusher members.

2. An apparatus according to claim 1, in which at least one of the pusher members is dimensioned so as to be able to engage and push all the strips positioned on the table.

3. An apparatus according to claim 1, in which each pusher member consists of a plurality of pusher elements arranged on a pusher carrier which is secured to the underside of a carriage capable of moving along a guide element secured above the table on which the strips are positioned, means being provided for selectively promoting the lifting or lowering of each pusher element of the pusher carrier with respect to the underlying table.

4. An apparatus according to claim 1 in which the pusher members are arranged on a support structure which is movable transversally with respect to the feeding direction of the strips, above the table on which the strips are positioned, means being provided for promoting the movement of the said support structure of predetermined lengths.

* * * * *